United States Patent [19]

Amrein et al.

[11] Patent Number: 5,113,779
[45] Date of Patent: May 19, 1992

[54] FLOTATION DEVICE FOR A COMBAT VEHICLE

[75] Inventors: Bruce E. Amrein, Bel Air; Curtis L. McCoy, Apg; Robert C. Brucksch, Harford County, all of Md.; George Melnik, Newark, Del.

[73] Assignee: The United States of America as represented by the Secretary of the Army, Washington, D.C.

[21] Appl. No.: 502,586

[22] Filed: Mar. 30, 1990

[51] Int. Cl.⁵ .............................................. B63F 3/00
[52] U.S. Cl. ...................................... 114/270; 114/68
[58] Field of Search ................. 114/123, 270, 68, 345, 114/283

[56] References Cited

U.S. PATENT DOCUMENTS

| | | | |
|---|---|---|---|
| 1,133,629 | 3/1915 | Foster | 114/68 |
| 1,319,424 | 10/1919 | Schneider | 114/68 |
| 2,453,149 | 11/1948 | McCutchen | 114/270 |
| 2,514,488 | 7/1950 | Hale et al. | 114/270 |
| 2,981,221 | 4/1961 | Gillois et al. | 114/270 |
| 3,595,198 | 7/1971 | Hacker | 114/270 |

Primary Examiner—Edwin L. Swinehart
Attorney, Agent, or Firm—Peter A. Taucher; David L. Kuhn

[57] ABSTRACT

Disclosed is a self deployed, self retracting flotation device for a land vehicle, the device including covers hinged to the sides of the vehicle. Inflatable air bags are attached to the covers so that inflating the bags swings up the covers and subsequently deflating the bags allows the covers to swing down. The device is constructed so that the bags protrude from between the cover and the vehicle when inflated and retract to a position between the cover and the vehicle when deflated. A reversible pump operable from within the vehicle is used to inflate or deflate the bags.

11 Claims, 7 Drawing Sheets

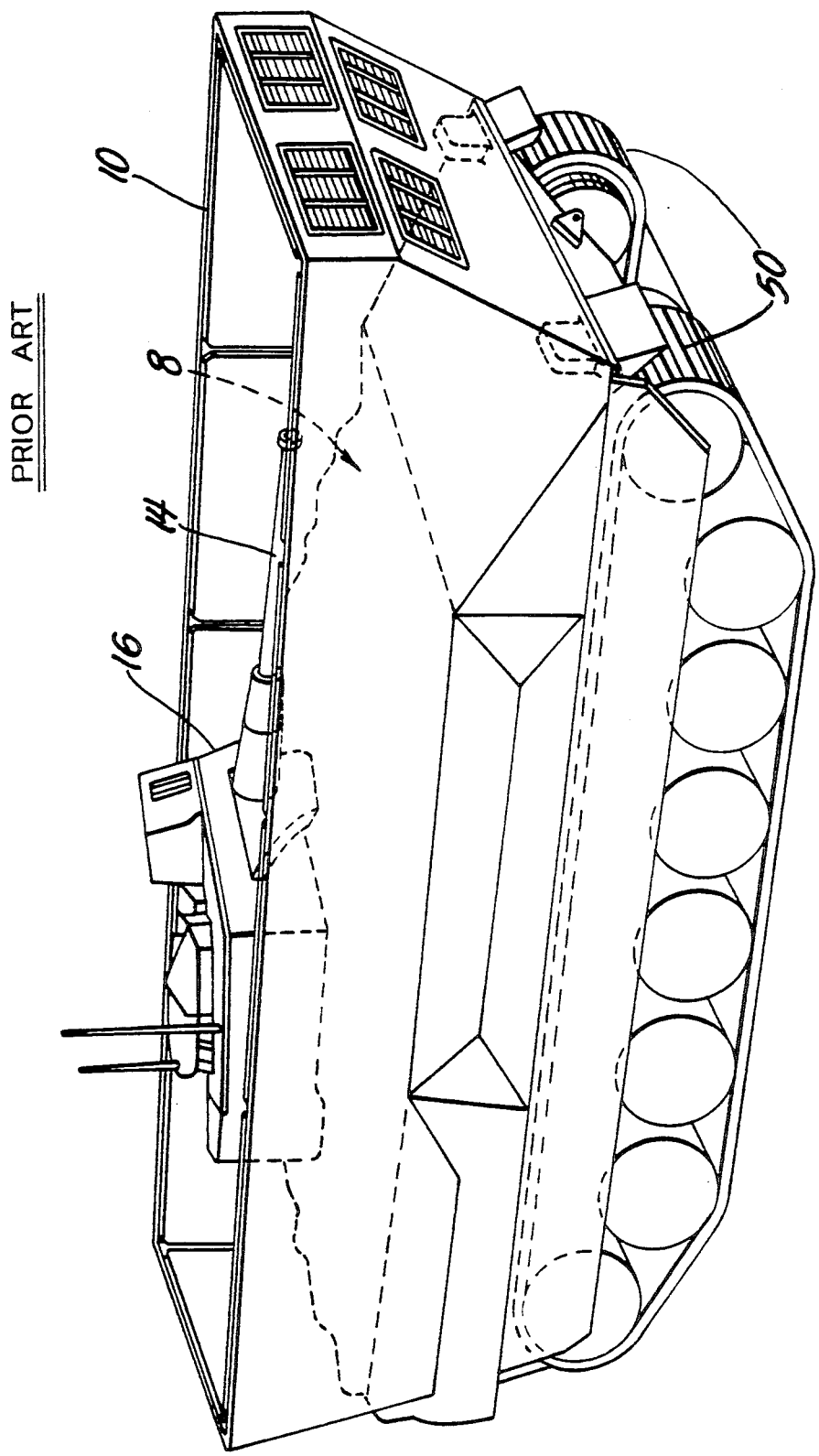

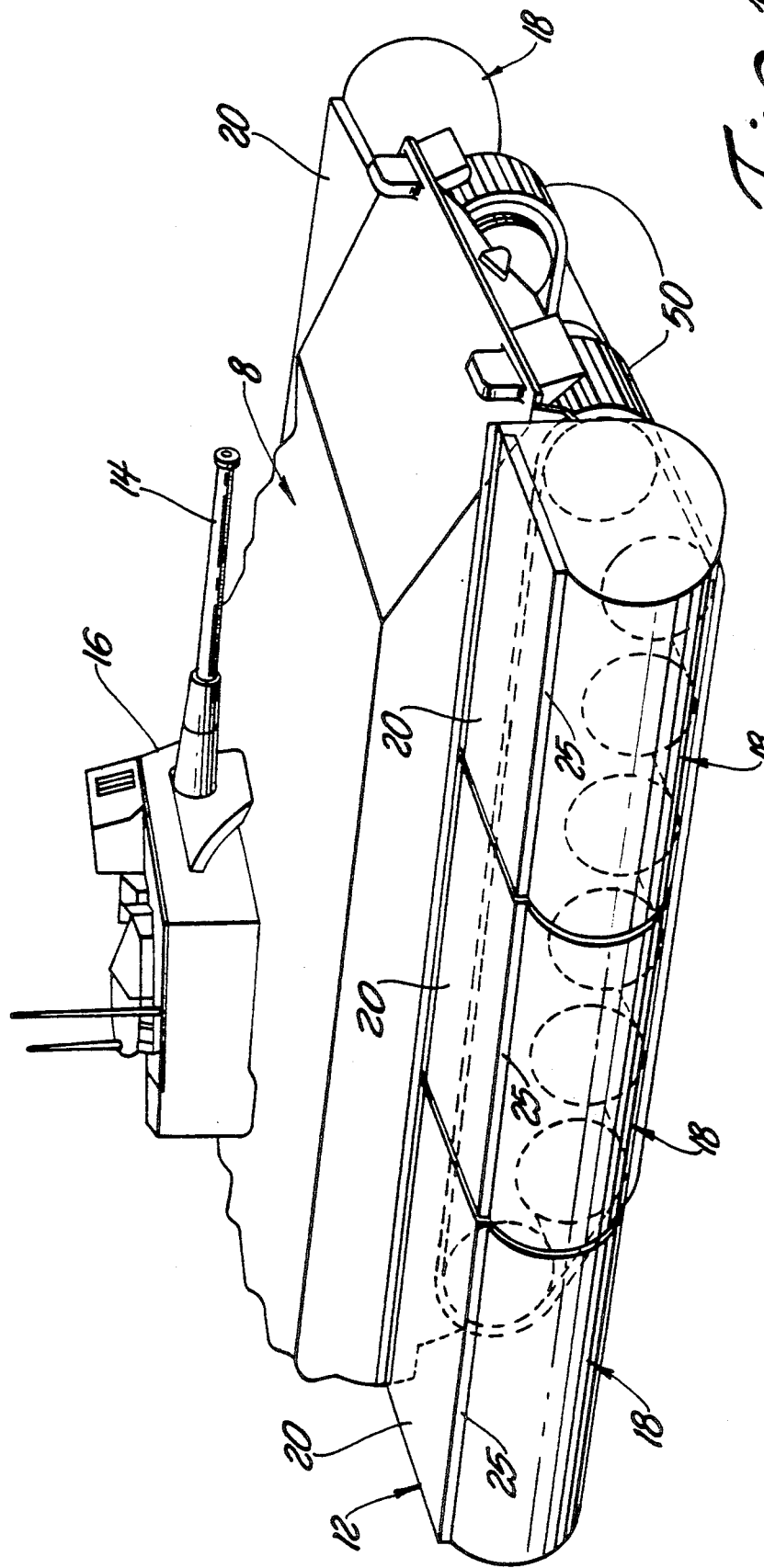

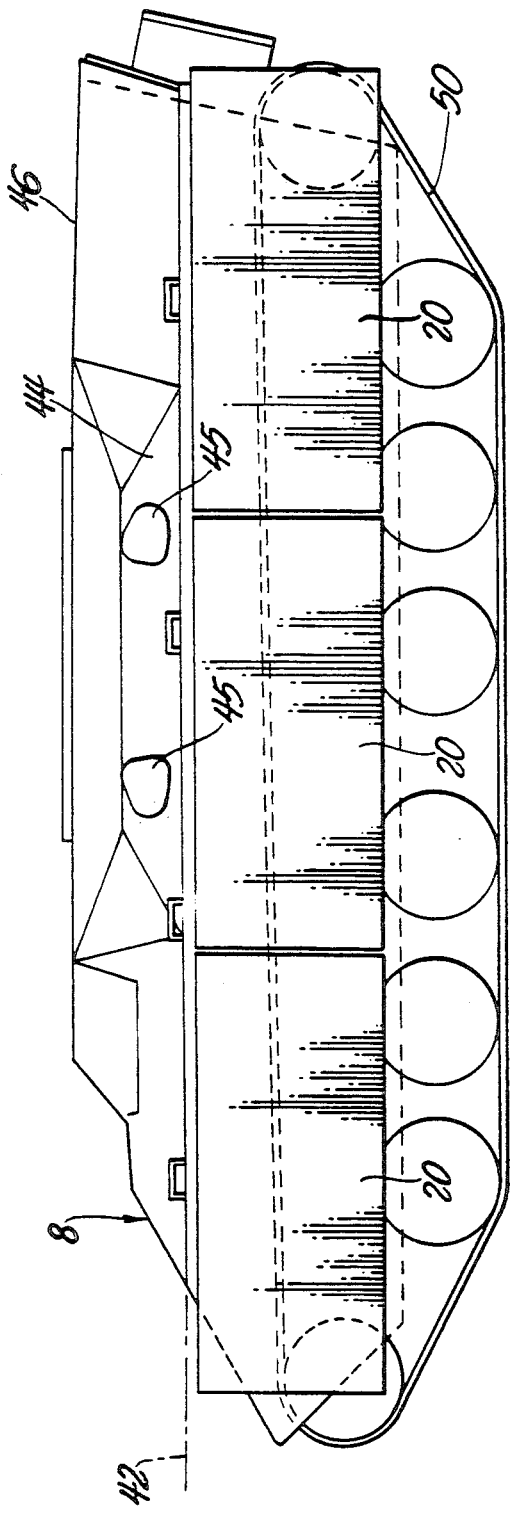
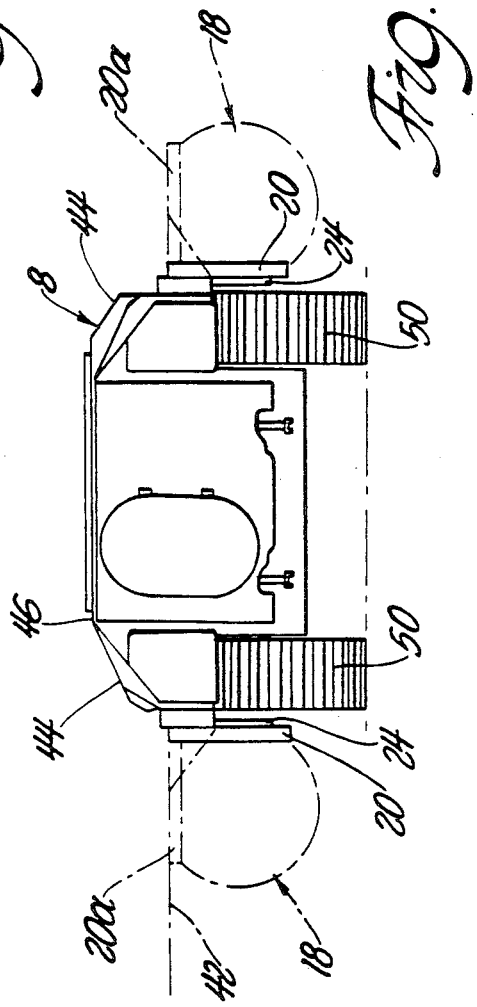

FLOTATION DEVICE FOR A COMBAT VEHICLE

GOVERNMENT INTEREST

The invention described herein may be manufactured, used and licensed by or for the United States Government for governmental purposes without payment to us of any royalty thereon.

BACKGROUND AND SUMMARY

The invention is a flotation device enabling armored combat vehicles to "swim" across bodies of water too deep for fording. Typical flotation devices for armored vehicles include a wall-like curtain erected about the upper periphery of the vehicle, as presently used on the U.S. Army's Bradley Fighting Vehicle. The curtain type of flotation device on the Bradley Fighting Vehicle has several problems. First, the turret gun is located lower on vehicle than the upper rim of curtain, so the gun can not be fired at an angle of less than about 15 degrees above the horizontal without damaging the curtain. Second, the vehicle crew can not see past the curtain from within the vehicle, so that a crew member must partly exit the vehicle and risk enemy fire to see where the vehicle is going. Third, the vehicle crew must exit the vehicle to erect or remove the curtain, possibly again exposing themselves to enemy fire. Fourth, installing a curtain on a unit such as the Bradley Fighting Vehicle takes 45 minutes or longer, thereby delaying the availability of this unit for combat.

To overcome disadvantages of the existing flotation devices, we propose a new, self deployed, self retracting flotation device. The new device is located along the lower lateral edges of vehicle so as not to interfere with operation of the turret gun or interfere with the vehicle crew's vision from within the vehicle. The new device has air bags inflatable by operating a switch in the vehicle, so that the crew need not exit the vehicle or expose itself to enemy fire to deploy the device. The new device deploys or retracts quickly, taking seven to eight minutes to perform either function. Further, the new flotation device increases the effective width of the vehicle so that the vehicle rides more steadily in the water and provides a more stable firing platform for the turret gun.

BRIEF DESCRIPTION OF THE DRAWINGS

FIG. 1a is perspective view of a light armored vehicle having the conventional wall-like "swim curtain" as a flotation device.

FIG. 1b is a perspective view of the same light armored vehicle as shown in FIG. 1a, except that the swim curtain has been removed and replaced by our pontoon like flotation device.

FIG. 3 is a side elevational view of a light armored vehicle with our flotation device installed thereon.

FIG. 4 is rear elevational view of the vehicle shown in FIG. 3.

DETAILED DESCRIPTION

Shown in FIG. 1a is a light armored vehicle 8 having a prior art flotation device in the form of swim curtain 18 which interferes with the swinging of gun 14 on turret 16 when the gun is at an essentially level position.

Figure 2:
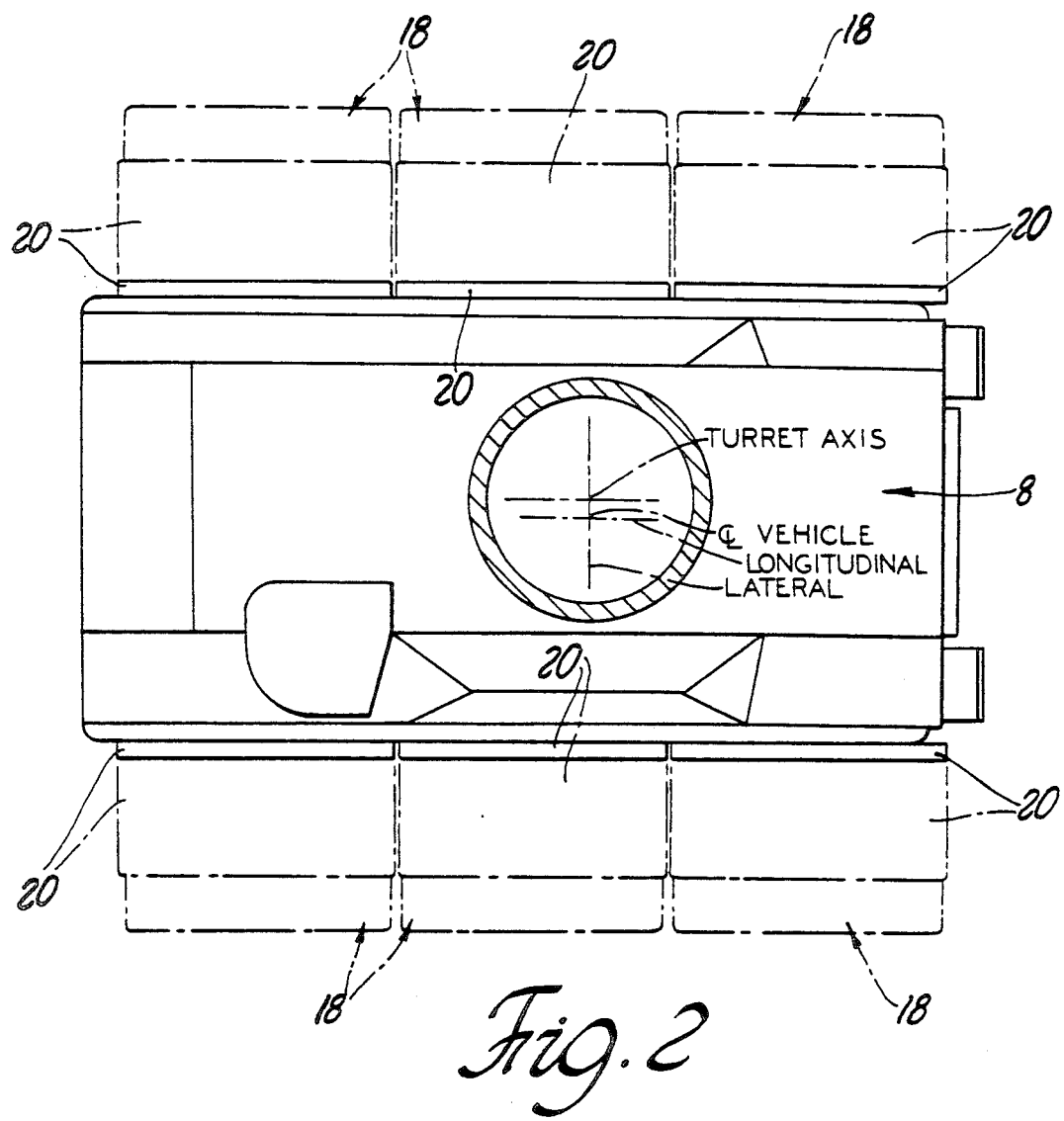
FIG. 2 is a plan view of a light armored vehicle having our flotation device installed.

The structure of our new flotation device 12 can perhaps be best explained by first referring to FIGS. 1b, 2 and 4. As can be seen in these figures, a group of three individual air bags 18 are placed end to end on either of two oppositely facing zones of the exterior of vehicle 8 so as to form a pontoon-like structure. Preferably, the pontoon-like structures are on either side of vehicle 8 and are parallel to the longitudinal axis of the vehicle. Associated with each bag 18 is a lid or cover 20 hinged to vertical plates 24, which are fixed to the hull of vehicle 8 and partly cover and protect both the hull and the vehicle track units 50. Covers 20 are pivoted to the top of plates 24 so that the covers swing upward and outward from a retracted, vertical position (FIGS. 3 and 7) when the bags are inflated. When the covers are in their swung out, deployed positions, they will be at or just below the water's surface while vehicle 8 floats. The inflated volume of the air bags and their height on the vehicle are chosen to assure that this occurs. By this arrangement, all, or essentially, all of the volume of inflated bags 18 will be submerged during vehicle flotation so that none of the bags' buoying capacity will be wasted. Additionally, the outboard side of the bags will be protected somewhat from small arms fire by the water surrounding the vehicle and covers 20 will protect the top of the bags from such fire. Also, should the vehicle be rocked from side to side, the air bags on one side of the vehicle will lift from the water, causing an imbalance in buoyant forces on opposite sides of the vehicle and tending to return the vehicle to a level position.

FIG. 4 shows the position water level 42 relative to vehicle 8 when air bags 18 are fully inflated and covers 20 are at their fully open position shown at 20a, it being noted that the top of the covers at 20a are at the water level 42. The upper hull zone 44 of vehicle 8 protrudes from the water and it will be possible if necessary to open firing ports 45 (FIG. 3) in zone 44, and soldiers in vehicle may shoot through the firing ports. It is preferred that deck surface 46 be approximately two feet above water line 42, the surface 46 being 26 inches above waterline 42 in a prototype of our flotation device that was installed on a Bradley Fighting Vehicle. This approximately two foot clearance inhibits waves above surface level 42 from washing over upper surface 46 of the vehicle hull and gives crew members the option of leaving a hatch (not shown) open on upper surface 46.

Figure 5:
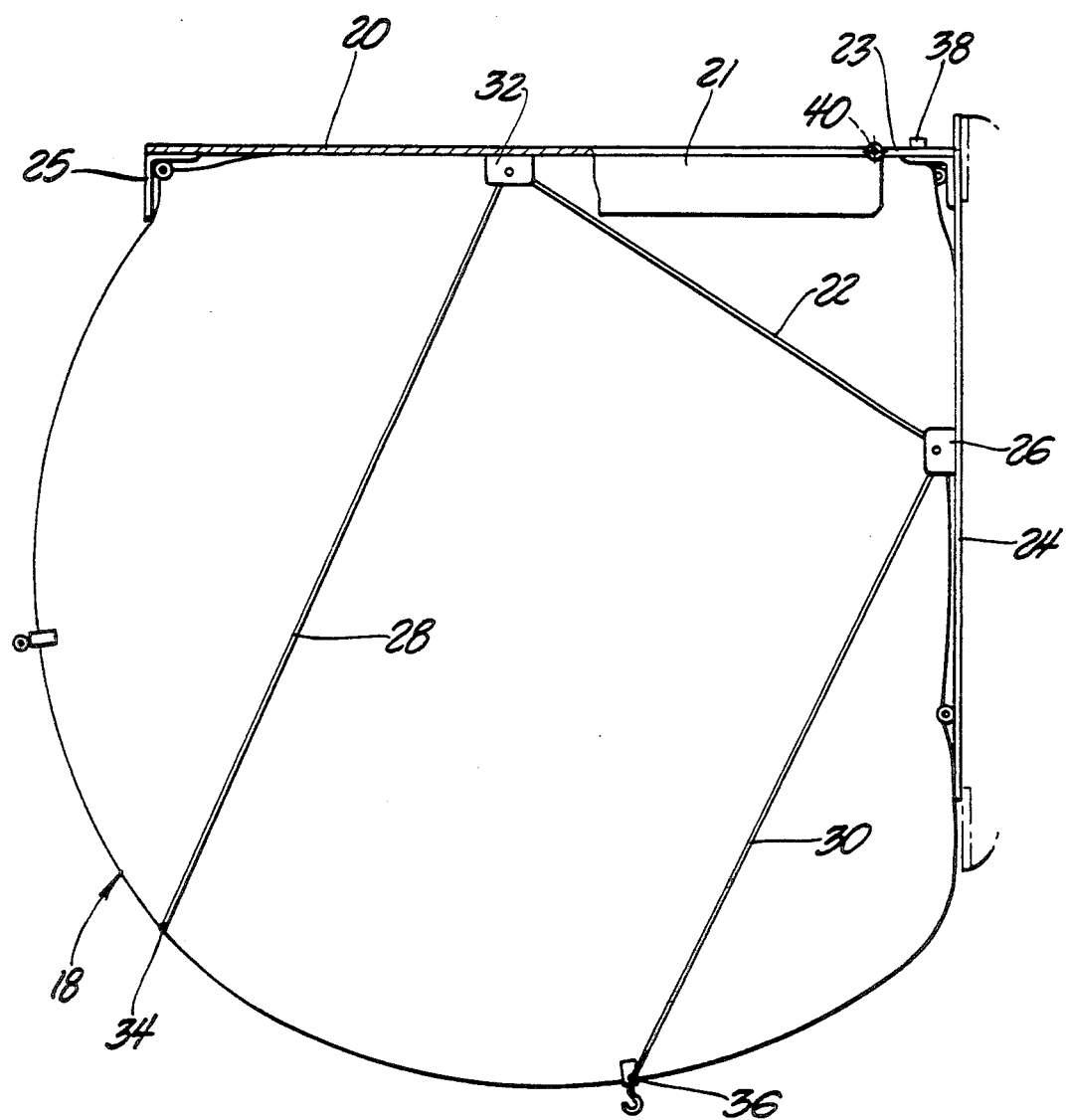
FIG. 5 is a cross sectional view of an inflated air bag that forms part of our flotation device.
Figure 6:
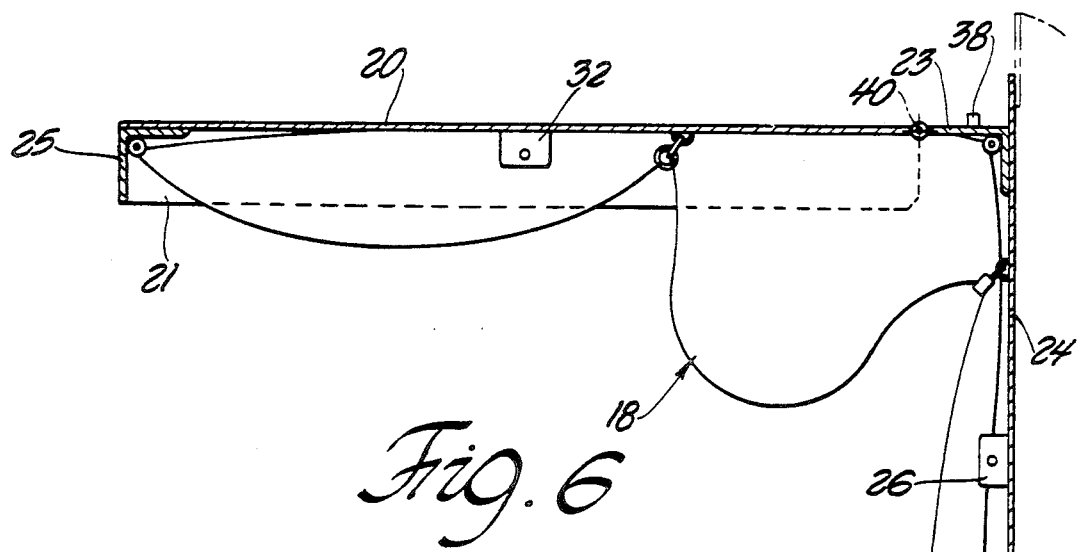
FIG. 6 is a cross sectional view of a deflated air bag and a protective cover of the air bag, the protective cover shown in its open, horizontal position.
Figure 7:
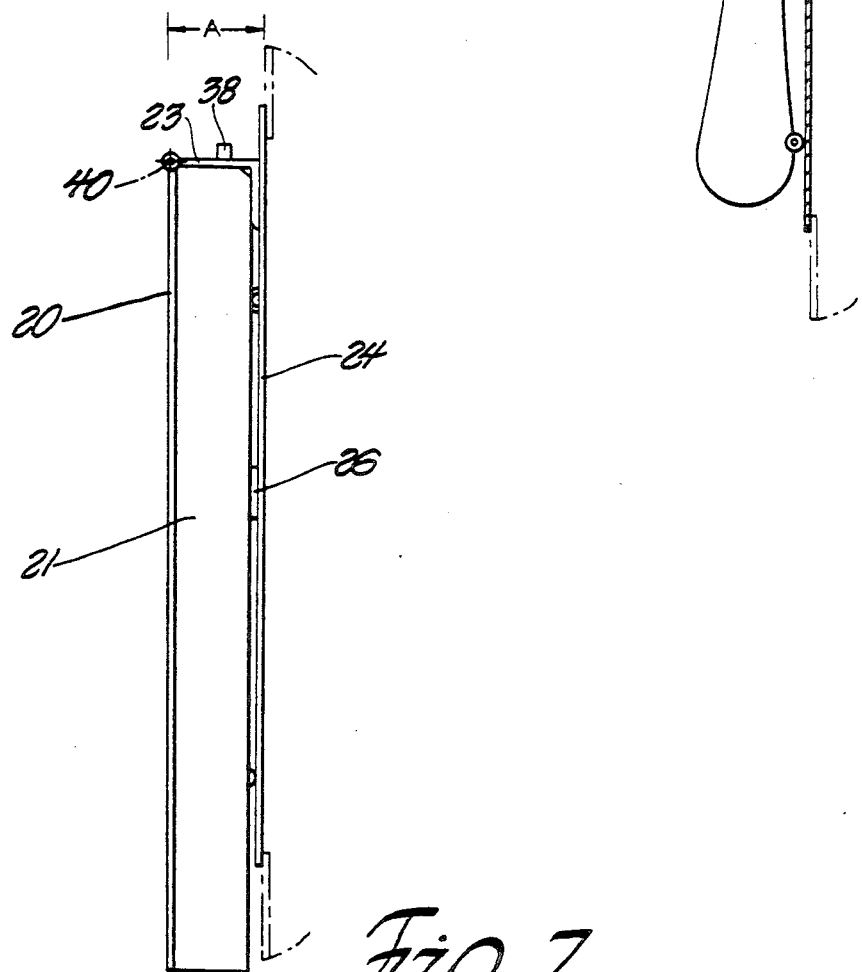
FIG. 7 is cross sectional view of the protective cover in a closed, vertical position, the air bag being omitted for clarity.

Further details of our flotation device 12 can be seen in FIGS. 5, 6 and 7. FIG. 5 is an end view of an inflated air bag 18 and cover 20, and FIG. 6 is a end of air bag 18 after it has been deflated but before cover 20 has swung down to its vertical, closed position. FIG. 7 is a cross section of cover 20 after it has swung down to its vertical, closed position. It will be noted that the inboard-to-outboard thickness between plate 24 and cover 20 (dimension "A" in FIG. 7) is approximately 4 inches. The assembly of cover 20, plate 24 and bag 18 in the retracted position is a thus flat rectangular structure that adds relatively little width to the vehicle.

Forward and aft flanges 21 (FIGS. 6 and 7) are at the end of each cover 20 and a lateral flange 25 is perpendicular to and continuous with the forward and aft flanges, so that all the flanges together form a protective skirt about three edges of cover 20. An angle bracket 23 (FIGS. 6 and 7) extends along the remaining edge of cover 20, the angle bracket acting as a protective skirt at the remaining edge of cover 20. Cover 20, flanges 21, flange 25, and angle bracket 23 enclose air bag 18 so as to protect the air bag from debris thrown by track unit 50 and from brush or other obstacles on the terrain which vehicle 8 travels.

Angle bracket 23 is fixed to or integral with plate 24 and has axis 40 about which cover pivots relative to bracket 23 and plate 24. It is preferable that cover 20 swing freely about axis 40 between its horizontal and vertical positions shown in FIGS. 6 and 7 respectively. In this way, the weight of cover 20 will tend to assist the return of cover 20 from its horizontal position to its vertical position when bag 18 is being deflated. After the bag is deflated, the weight of cover 20 will keep the cover in a vertical or essentially vertical position, so that the deflated bag is protected from small arms fire.

In FIG. 5 is shown a nylon strap 22 that is connected between cover 20 and plate 24 of the vehicle at bracket 26, so that cover 20 can swing no more than 90 degrees from plate 24. Such a strap is at either end of each bag. It may be desirable to make bags 18 from a material that will tend to remember its FIG. 6 shape or a shape similar to this, so that the air bag will more readily re-enter the space between cover 20 and plate 24 when the bag deflates. The bag can be constructed so that it will elastically stretch when inflated and swing cover 20 from the FIG. 7 position to the FIG. 6 position; thereafter, if the bag is deflated, it will pull cover 20 toward the FIG. 6 position from the FIG. 7 position. As another option, elastic cords 28 and 30 could be connected respectively between bracket 32 and point 34 of the bag's inner wall and between bracket 26 and point 36 on the bag's inner wall. These cords would be under tension when the bag is inflated and would help pull the bag into the space between cover 20 and plate 24 when the bag is deflated.

By a comparison of FIGS. 5 and 6, one can see that bag 18 will when inflated have a remote portion extending further from axis 40 than does cover 20. Points 34 and 36 (FIG. 5) lie in the remote portion of bag 18. As seen from FIGS. 6 and 7, the remote portion of the bag points 34 and 36 will be retracted to a position between cover 20 and plate 24 when cover 20 is lowered to the FIG. 7 position.

FIG. 5 also shows a port 38, which is provided to allow air to enter or exit the bag. A pump is connected to port 38 for inflating bag 18 and for drawing air out of bag 18 when the bag is deflated. The pump will be located inside vehicle 8 and will be powered by a generator driven by the vehicle's engine. The bags shown in the figures are preferably made of neoprene coated nylon and will be inflated at 2 to 4 psi. It has been observed that bags so constructed and pressurized can sustain small bullet hits and still be maintained in an inflated condition.

Figure 8:
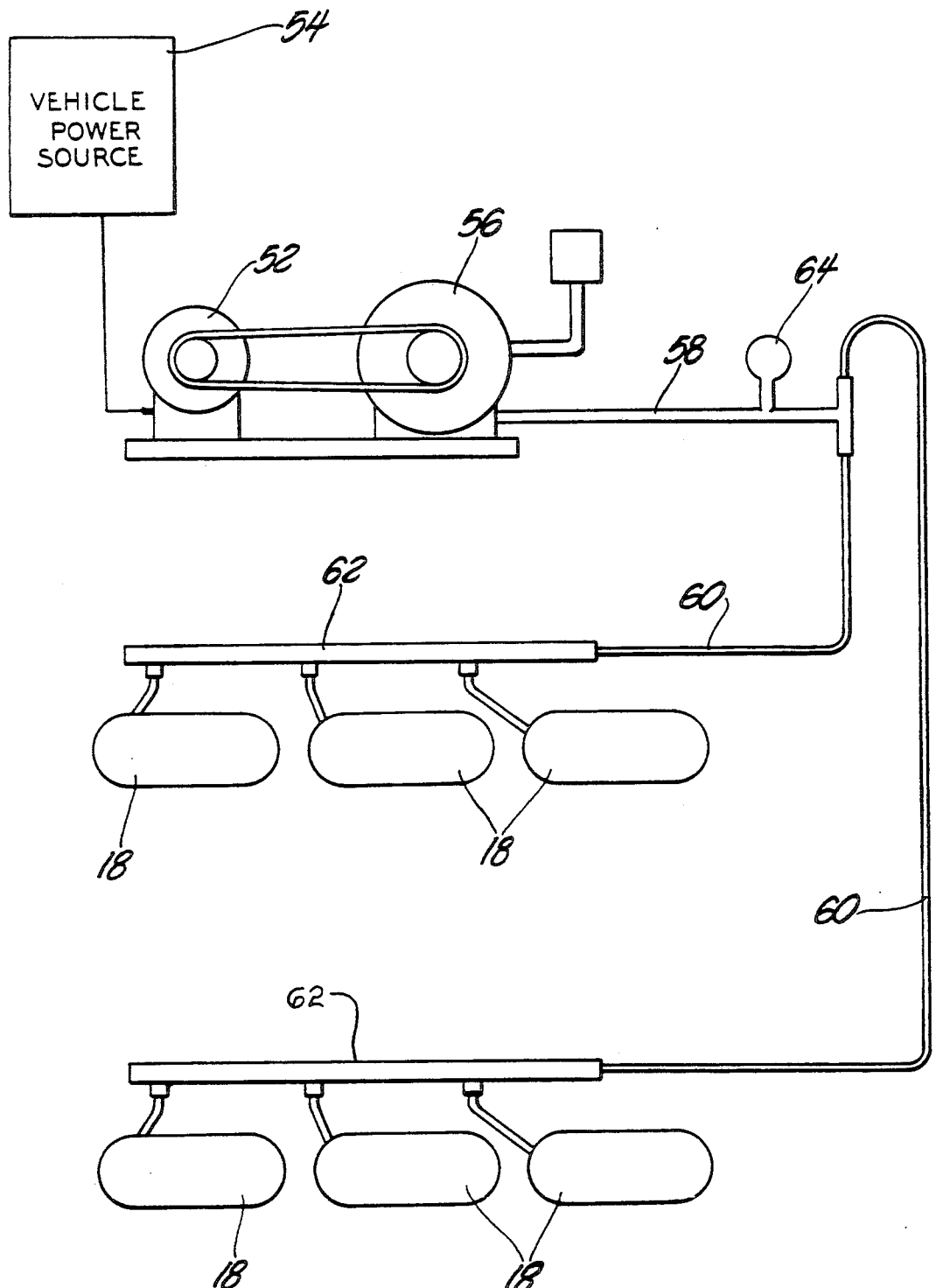
FIG. 8 is a semi-schematic view of a system for inflating and deflating air bags of our flotation device.

FIG. 8 is a semi-schematic diagram of the system for inflating and deflating air bags 18 in our flotation device. The system includes a reversible electric motor 52 which is energized by a power source 54 such as a generator driven by the vehicle engine. When our flotation device is being deployed, motor 52 drives a regenerative blower or air pump 56 so as to force air through conduit 58, through flexible lines 60, through manifolds 62, and into bags 18. Connected to conduit 58 is a blow-off valve 64, which opens to release air when the pressure in the system exceeds a predetermined level. In our prototype flotation device, the six fully inflated air bags displace 332 cubic feet, or 20,750 pounds of water, and a gauge pressure of approximately three pounds was sufficient to keep bags 18 inflated. To retract our flotation device, electric motor 52 is reversed so that the regenerative blower becomes a vacuum pump. As air leaves the bags, the bags retract and covers 20 swing down over the bags.

Operationally, our self-deployable flotation apparatus is used to "swim" the vehicle across a slow moving stream or river or a lake. Before the vehicle enters the water, the vehicle drain plugs (not shown) are closed and the vehicle bilge pumps (not shown) are readied. A vehicle crew member turns on regenerative blower 56 so that bags 18 begin to inflate, and the bags start pivoting the covers to the horizontal position. The vehicle then enters the water and proceeds to a depth where the water reaches level 42 (FIG. 4) on the vehicle, which is the level cover 20 attains in its horizontal position. Keeping the vehicle at this depth during deployment of the flotation device protects the air bag from enemy fire during the deployment process. After bags 18 are fully inflated and covers 20 reach their horizontal positions, the vehicle proceeds to deeper water where it floats and uses track units 50 to propel and steer itself. The vehicle swims toward the exit point until the water becomes shallow enough for the vehicle to establish traction. Motor 42 is then reversed, the bags begin to deflate, and covers 20 begin to lower toward their vertical, retracted position. When the flotation device completes retracting, the vehicle leaves the water.

We wish it to be understood that we do not desire to be limited to the exact details of construction shown and described since obvious modifications will occur to those skilled in the relevant arts without departing from the spirit and scope of the following claims.

What is claimed is:

1. A device for enabling a land vehicle to float in a body of water, comprising:

a cover at each of two oppositely racing zones of the exterior of the vehicle, the covers having a first position where the covers face toward the zones and having a second position where the covers extend away from the zones;

a pivotal connection swingably attaching the covers to the zones;

an inflatable bag connected to each cover;

means to connect the bags to the zones;

mechanical means to inflate and deflate the bags such that inflation of the bags places the covers in the second position and deflation of the bags places the covers in the first position, the bags being disposed between the covers and the zones when the covers are in the first position; and wherein the mechanical means is a pump for positively displacing air, and there is a net transfer of energy from the mechanical means to the air, the pump being a reversible pump, whereby the pump can both inflate and deflate the bags.

wherein the entire volume of the bags displaces water when the vehicle floats and the covers comprises flat walls, the flat walls being disposed along the surface of the water immediately above the bags during the second position of the covers.

2. The device of claim 1 wherein the pump supplies air at substantially ambient temperature to the bags.

3. The device of claim 1 wherein the bags have an inflated condition during which a retracted portion of the bags extend to a remote position further from the pivotal connection than do the covers, whereby the bags occupy a greater volume than the space through which the covers swing during travel between the first and second positions.

4. The device of claim 3 wherein the bag is constructed at least partly of elastomeric material, the bag having in its free, undeformed state a flat, folded shape wherein the retracted portion is withdrawn to an interior position between the plate and the cover, the bag further having an deformed, unfolded state during which the retracted portion of the bag is elastically extended to the remote position.

5. The vehicle of claim 4 wherein the vehicle defines an upper hull zone on the exterior of the vehicle, the upper hull zone being higher on the vehicle than the covers in the second position.

6. The vehicle of claim 5 wherein the upper zone defines an access hatchway.

7. A land vehicle reconfigurable to float on a body of water, comprising:
a vehicle body having two sides, a front, and a rear;
means attached to the sides for tractively engaging the ground;
a cover outboard of each side and having a hinged connection to the side, the covers having a first position where the covers face toward the side and a second position where the covers extend away from the side;
an inflatable bag disposed entirely between the cover and the side during the first position;
the vehicle having a mechanical means to inflate and deflate the bags, inflation of the bag causing the covers to pivot toward the second position and deflation of the bags causing the covers to move the first position;
the bags having during the second position a top planar surface disposed with the cover along the surface of the body of water;
the bags having an inflated condition during which a portion of the bags extend to a remote, underwater position further from the hinged connection than do the covers, whereby the bags occupy a greater volume than the space through which the covers swing during travel between the first and second positions.

8. The land vehicle of claim 7 wherein the covers have flat surfaces disposed along the surface of the body of water during the second position.

9. The device of claim 8 wherein the bag is constructed at least partly of elastomeric material, the bag having in its free, undeformed state a flat, folded shape wherein the portion is retracted to an interior position between the plate and the cover, the bag further having an deformed, unfolded state during which the portion of the bag is elastically extended to the remote position.

10. A device for enabling a land vehicle to float in a body of water, comprising:
a cover at each of two oppositely facing zones of the exterior of the vehicle, the covers having a first position where the covers face toward the zones and having a second position where the covers extend away from the zones;
a pivotal connection swingably attaching the covers to the zones;
an inflatable bag connected to each cover;
means to connect the bags to the zones;
mechanical means to inflate and deflate the bags such that inflation of the bags places the covers in the second position and deflation of the bags places the covers in the first position, the bags being disposed between the covers and the zones when the covers are in the first position; and
wherein the mechanical means is a pump for positively displacing air, and there is a net transfer of energy from the mechanical means to the air, the pump supplying air at substantially ambient temperature to the bags;
wherein the entire volume of the bags displaces water when the vehicle floats, and the covers comprise flat walls, the flat walls being disposed along the surface of the water immediately above the bags during the second position of the covers;
the bags having an inflated condition during which a portion of the bags extend to a remote position further from the pivotal connection than do the covers, whereby the bags occupy a greater volume than the space through which the covers swing during travel between the first and second positions;
the bag being constructed at least partly of elastomeric material, the bag having in its free, undeformed state a flat, folded shape wherein the portion is retracted to an interior position between the plate and the cover, the bag further having an deformed, unfolded state during which the portion of the bag is elastically extended to the remote position;
the vehicle defining an upper hull zone higher on the vehicle than the covers in the second position, the upper zone defining an access hatchway.

11. The device of claim 10 wherein the pump is a reversible pump, whereby the pump can both inflate and evacuate the bags.

* * * * *